US012229933B2

(12) United States Patent
Zhu et al.

(10) Patent No.: US 12,229,933 B2
(45) Date of Patent: Feb. 18, 2025

(54) METHOD FOR GRAIN SIZE ANALYSIS

(71) Applicant: Seagate Technology LLC, Fremont, CA (US)

(72) Inventors: Sha Zhu, Fremont, CA (US); Maissarath Nassirou, Fremont, CA (US); Cindy Ng, Fremont, CA (US); Caiyan Lu, Campbell, CA (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 472 days.

(21) Appl. No.: 17/539,964

(22) Filed: Dec. 1, 2021

(65) Prior Publication Data

US 2023/0169637 A1 Jun. 1, 2023

(51) Int. Cl.
   *G06T 7/00* (2017.01)
   *G06T 5/77* (2024.01)
   *G06T 7/11* (2017.01)

(52) U.S. Cl.
   CPC .............. *G06T 7/0004* (2013.01); *G06T 5/77* (2024.01); *G06T 7/11* (2017.01); *G06T 2207/10061* (2013.01); *G06T 2207/20132* (2013.01); *G06T 2207/30128* (2013.01)

(58) Field of Classification Search
   CPC . G06T 2207/10061; G06T 2207/20132; G06T 2207/30108; G06T 2207/30128; G06T 5/70; G06T 5/77; G06T 7/0004; G06T 7/11; G06T 7/136; G06T 7/155; G06T 7/194; G06T 7/62
   See application file for complete search history.

(56) References Cited

U.S. PATENT DOCUMENTS

| | | | |
|---|---|---|---|
| 6,771,802 B1* | 8/2004 | Patt | G01T 1/161 382/128 |
| 2019/0329319 A1* | 10/2019 | Zhu | C22C 38/32 |
| 2023/0143286 A1* | 5/2023 | Rodriguez Suarez | B23K 20/1255 228/2.1 |
| 2023/0244152 A1* | 8/2023 | Wang | G03F 7/70433 430/270.1 |
| 2023/0414835 A1* | 12/2023 | Szereszewski | A61L 27/3637 |

OTHER PUBLICATIONS

Ferreira et al., "ImageJ User Guide", Oct. 2, 2012, https://imagej.net/ij/docs/guide/user-guide.pdf (Year: 2012).*

* cited by examiner

*Primary Examiner* — Zhiyu Lu
(74) *Attorney, Agent, or Firm* — Holzer Patel Drennan (57) ABSTRACT

Methods for analysis of the magnetic grain using a software program effectively and accurately by improving the magnetic grain boundary contrast from an image prior to analyzing the grain size with an imaging analysis program. A method for automated grain size analysis includes obtaining a SEM electronic image of a magnetic material composed of a plurality of grains and modifying the image by smoothing the image, removing high spatial and low spatial frequencies from the image, improving contrast of the image, pixelating the image, processing the image to a binary image, and clearing outer edges of the binary image to remove at least incomplete grains to generate grain size data from the image.

20 Claims, 13 Drawing Sheets

METHOD FOR GRAIN SIZE ANALYSIS

BACKGROUND

Grain size reduction in magnetic media has historically been a pathway for increasing areal density in magnetic media technology, such as hard disk drive (HDD) media technology. For good magnetic performance, the grain size needs to be consistent, across the disk and also from disk to disk.

Grain size is affected by the deposition and other production parameters of the magnetic media. In some instances, utilizing the same parameters as the previous day or week may not result in the same grain size. Thus, the grain size is carefully monitored, e.g., using transmission electron microscopy (TEM) to achieve images of the magnetic grains and analyze those images. The image processing and grain size analysis is commonly a manual process, as TEM image contrast is complicated and no suitable software can recognize the grain boundaries successfully. Currently, it could take as much as one full day to complete one sample's analysis. At the same time, the analysis results may vary due to different analyzers.

Use of high-resolution scanning electron microscopy (SEM) helps to improve work efficiency. Much grain size analysis imaging has switched from TEM to SEM to expedite the grain size analysis process. The SEM image contrast has significant differences with TEM images, which makes it possible to use software to analyze grain boundaries. However, there is no commercial software currently available to do the magnetic grain size analysis easily and effectively.

SUMMARY

The present disclosure provides a method for analyzing magnetic grain size. The present disclosure provides a method for improving the magnetic grain boundary contrast from an image prior to analyzing the grain size with an imaging analysis program. The disclosure provides a pre-analysis imaging process method, that when applied to an SEM image or other suitable image, improves the accuracy and efficiency of a subsequent image analysis.

In one particular implementation, this disclosure provides a computer-implemented method for automated grain size analysis, the method comprising obtaining a scanning electron microscope (SEM) electronic image of a magnetic material composed of a plurality of grains, and modifying the image to generate grain size data from the image. The modification is done by smoothing the image, removing high spatial and low spatial frequencies from the image, improving contrast of the image, pixelating the image, processing the image to a binary image, and clearing outer edges of the binary image to remove at least incomplete grains.

In another particular implementation, this disclosure provides a computer-implemented method for automated grain size analysis, the method comprising obtaining a scanning electron microscope (SEM) electronic image of a magnetic material composed of a plurality of grains, applying a smoothing to the SEM digital image to obtain a smoothed image, applying an image filter to the smoothed image to remove high spatial and low spatial frequencies to obtain a filtered image, applying a robust threshold selection to the filtered image to obtain an improved contrast image, applying a watershed algorithm to the improved contrast image to obtain a segmented image, applying a second threshold to the segmented image to obtain a pixelated image, processing the pixelated image to a binary image, clearing outer edges of the binary image to remove at least incomplete grains, and generating grain size data from the binary image.

These and other aspects of image processing method described herein will be apparent after consideration of the Detailed Description and Figures herein. It is to be understood, however, that the scope of the claimed subject matter shall be determined by the claims as issued and not by whether given subject matter addresses any or all issues noted in the Background or includes any features or aspects recited in the Summary.

DETAILED DESCRIPTION

The present disclosure is directed to a SEM image analysis method for determining magnetic grain size, which includes a processing method for improving the magnetic grain contrast from an image prior to analyzing the grain size; the magnetic grain contrast is improved via a boundary recognition method using specific algorithms and grain size analysis. The method of this disclosure avoids manual (human user) analysis. The method of this disclosure utilizes a series of steps to recognize and segregate the grain boundaries prior to image analysis, thus the characterization of the grains is independent of the user, is faster, and is more accurate.

The process of grain size analysis of magnetic media (such as hard disk drive (HDD) magnetic media) analyzes the microstructure characteristics of the magnetic grains of the media. Knowing the microstructure of the magnetic grains provides guidance for understanding the effects of growth conditions of the magnetic grains and provides feedback to guide the design of future growing processes. Having an analysis process that is quick and highly reproducible is beneficial, for if out-of-tolerance magnetic grains are found on media, changes can be made to the deposition process to correct subsequent media. This disclosure provides a method that is quicker and more consistent than previous processes for magnetic grain characterization.

The automated grain size method uses an imaging analysis software program to determine magnetic grain size. The method includes pre-analysis image processing that includes various scripts to analyze the magnetic media grain size, automatically, without the need for manual visualization of the images. The method includes, step-wise, image processing algorithms for image filtering, noise removal, thresholding, grain segregation and batch data processing.

The automated grain size method of this disclosure improves grain size analysis efficiency and capacity over previous analysis methods, such as those which do not include the improved grain boundary contrast. The improvement recognized can be at least 10 times faster than the previous methods. In addition to being faster than manual enhancement of the grain boundaries, the method reduces and may even eliminate human variability and/or bias.

In previous grain size pre-analysis methods, a user would manually draw or trace the grain boundaries seen in a TEM photomicrograph, e.g., on another writing pad, to generate grain segregation images. The user (or other user) would then use an imaging analysis program to process the hand-drawn images, one by one, to calculate the area and perimeter of the desired magnetic grains.

However, different users draw or trace the grain boundaries with, e.g., +/−3% variation, which results in different grain characteristics, depending on the user; thus, to decrease variation, dedicated users were assigned to draw or trace the grain boundaries. Additionally, the total time to prepare (e.g., draw or trace) and analyze an image may be as much as 45 minutes per image.

Due to the slow manual process, the samples to be analyzed were screened or triaged, so that only the most demanding or questionable samples would be analyzed. In some instances, for experimental or design of experiment (DOE) operations, a large number of samples were not able to be analyzed, which would delay the research progress.

The automated grain size analysis method of this disclosure reduces analysis variation and errors due to user errors and user variation, increases throughput since dedicated drawers/tracers are no longer required, and decreases the average preparation and analysis time to as little as 5 minutes per image. The grain size analysis efficiency has been greatly improved e.g., by 10 times, such that the analysis can be applied to each sample as desired. The analysis results help to determine the further actions and process optimization, which can be quickly implemented based on the analysis results.

This disclosure provides an image processing method that includes a methodology (e.g., algorithms, code, scripts) to segregate the media magnetic grains with oxide grain boundaries and subsequently calculate the grain size. The coding scripts address numerous aspects for magnetic grain size analysis, including, scale set-up, removal of distorting or distorted grains, image filtering, thresholding, watershed algorithm to recognize grain boundary and segregation, and grain perimeter and area counts, prior to the grain size analysis, calculation, or determination. In one implementation, the grain size analysis is performed using one or more computer instructions configured for processing an image to determine size of the grains. For example, computer instructions may be configured to divide the image into plurality of lines and for each line count the number of grain boundaries intersecting the line. Subsequently, the average grain size for each line may be calculated by the division of the number of intersections by the actual line length. The average grain size for the image may be determined as the average grain sizes of each of the plurality of lines. Alternatively, a grain size image processing software may be used to analyze the grain sizes. An example of such image processing software is Fiji™ (imageJ™) image processing software. The coding scripts produce an image that results in more accurate and reproducible grain size determination by the image processing software.

The automated methodology of this disclosure provides a reproducible workflow that can be applied to any magnetic media (e.g., perpendicular recording media and heated assistant recording (HAMR) media) having any grain size, as long as a good quality SEM image can be obtained.

After analysis with the imaging procession software, the grain size analysis output can be organized, such as in a folder with, e.g., the input image, the output image, and numerical data. The automatically created and organized the folder with the original and/or processed images and data list can be a product of the methodology. The processed data can be provided as, e.g., a list, a spreadsheet, or a graph, any of which can be utilized as they are or subsequently manipulated.

Having the output results as well as the input data (image) allows the user to review (e.g., manually) the input image and the processed images to confirm or at least estimate the accuracy of the output results. For example, if the original images do not have sufficient qualities, the processed images may show more dangling edges resulting in many non-counted grains, which could skew the final grain size analysis statistical results; such an image and the resulting data could then be excluded from the final analysis.

In some implementations, the whole process time to prepare and analyze one image is less than 5 minutes, e.g., about 2 minutes. Thus, grain size analysis efficiency is greatly improved by utilizing the pre-analysis image processing method of this disclosure.

The automated grain size analysis method includes, starting with an image such as an SEM image, applying image smoothing, bandpass filtering, watershed segmentation, and creating a binary image. Additional steps may be included. In some implementations, one or more of the disclosed steps may be avoided.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below.

Figure 1:
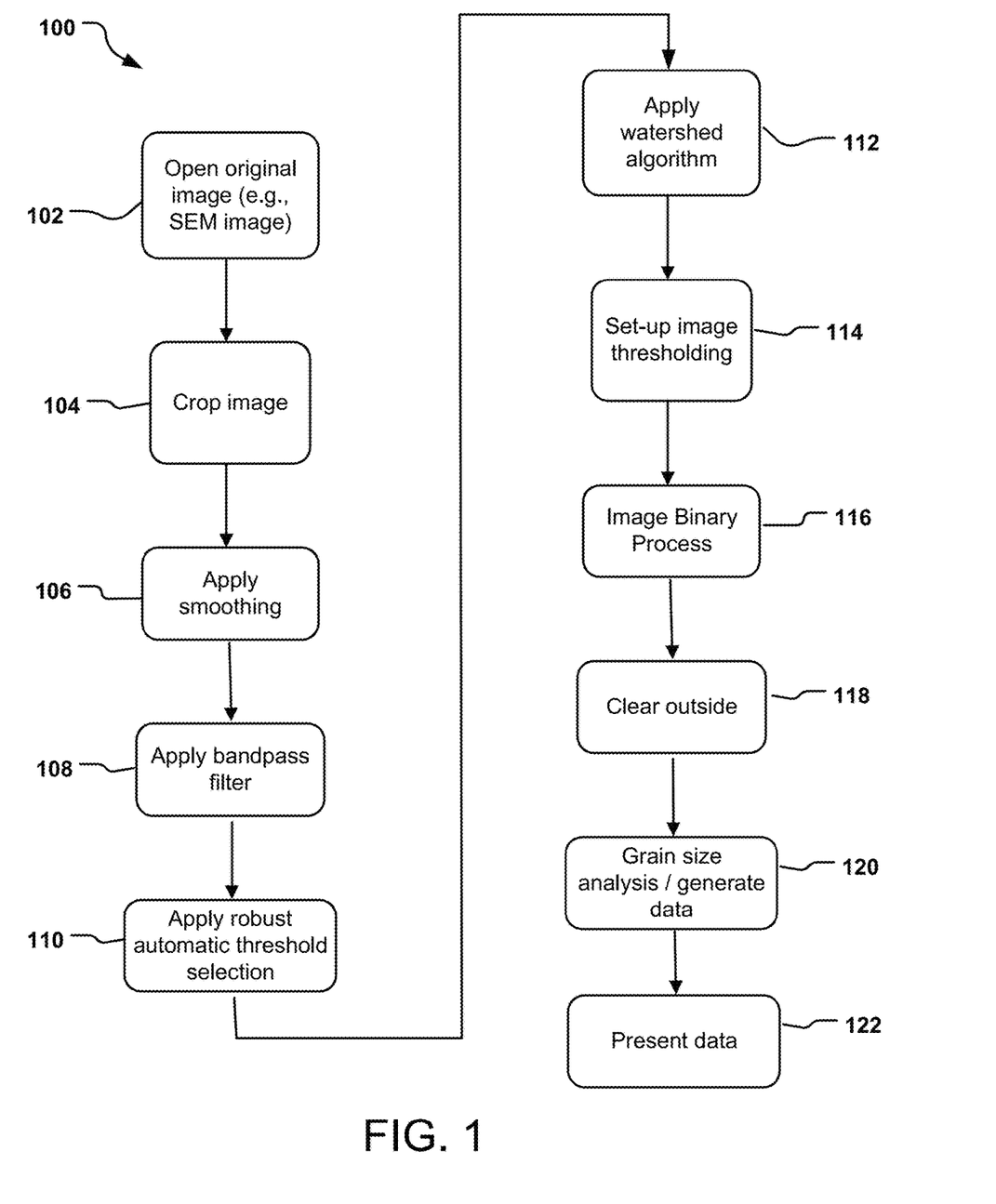
FIG. 1 is a flow diagram of image processing and grain analysis method according to this disclosure, which includes a pre-analysis image processing method.

Turning to the figures, FIG. 1 shows a step-wise flow diagram of a pre-analysis image processing method 100 for the automated grain size analysis.

Figure 2:
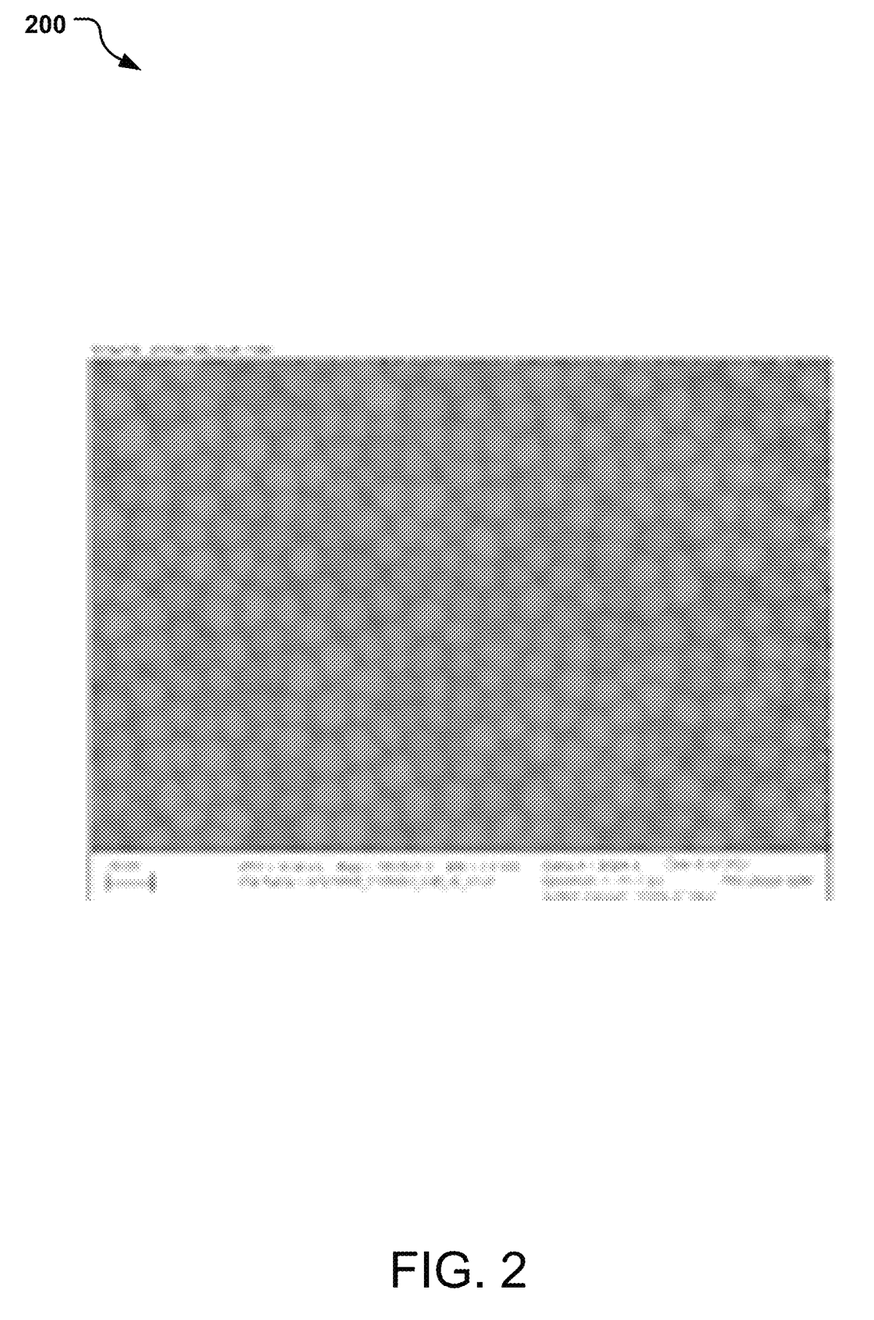
FIG. 2 is a SEM photomicrograph of a portion of magnetic media showing the magnetic grains.

In a first step 102, a SEM image or other suitable electronic image is obtained, e.g., stored, e.g., in a folder, on a computer memory or a computer's removable memory (e.g., memory stick). The SEM image may be a digital image. FIG. 2 shows an example SEM image 200 of a portion of a surface of a magnetic media. Most of the grains seen in the image 200 are approximately 5 to 8 nm in diameter.

The electronic image may be opened automatically by the method 100, meaning, that a user is not required to start the image processing method 100 by opening the image 200, but that the software providing the method 100 is able to open or access the image 200 once the method 100 has initiated. A single image 200 or a batch of multiple images (e.g., grouped in a folder, or with a common identifier) may be opened simultaneously, and/or a single image or a batch of multiple images may simultaneously undergo the pre-analysis image processing method 100.

Figure 3:
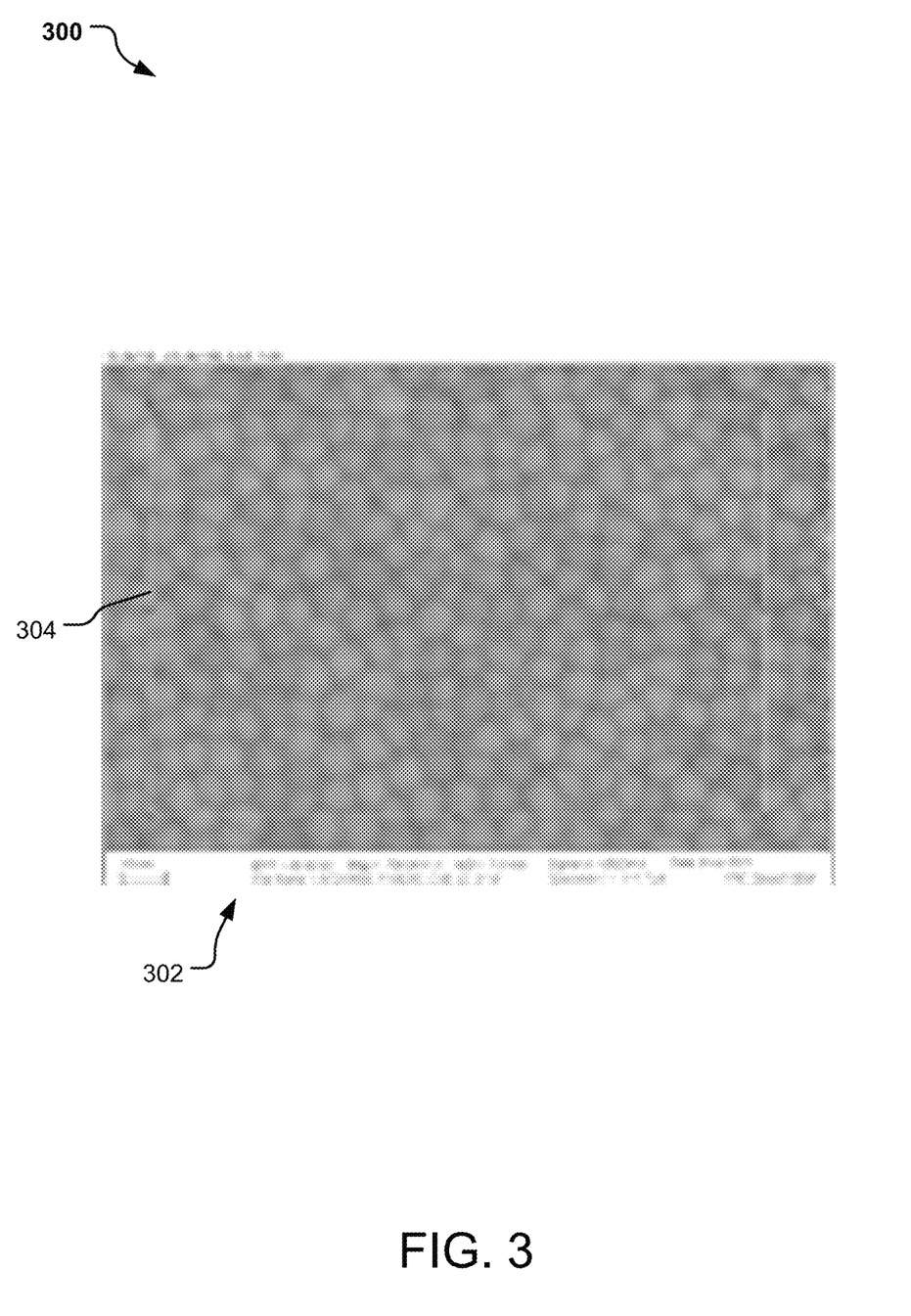
FIG. 3 is the SEM photomicrograph of FIG. 2 illustrating how the image will be cropped.
Figure 4:
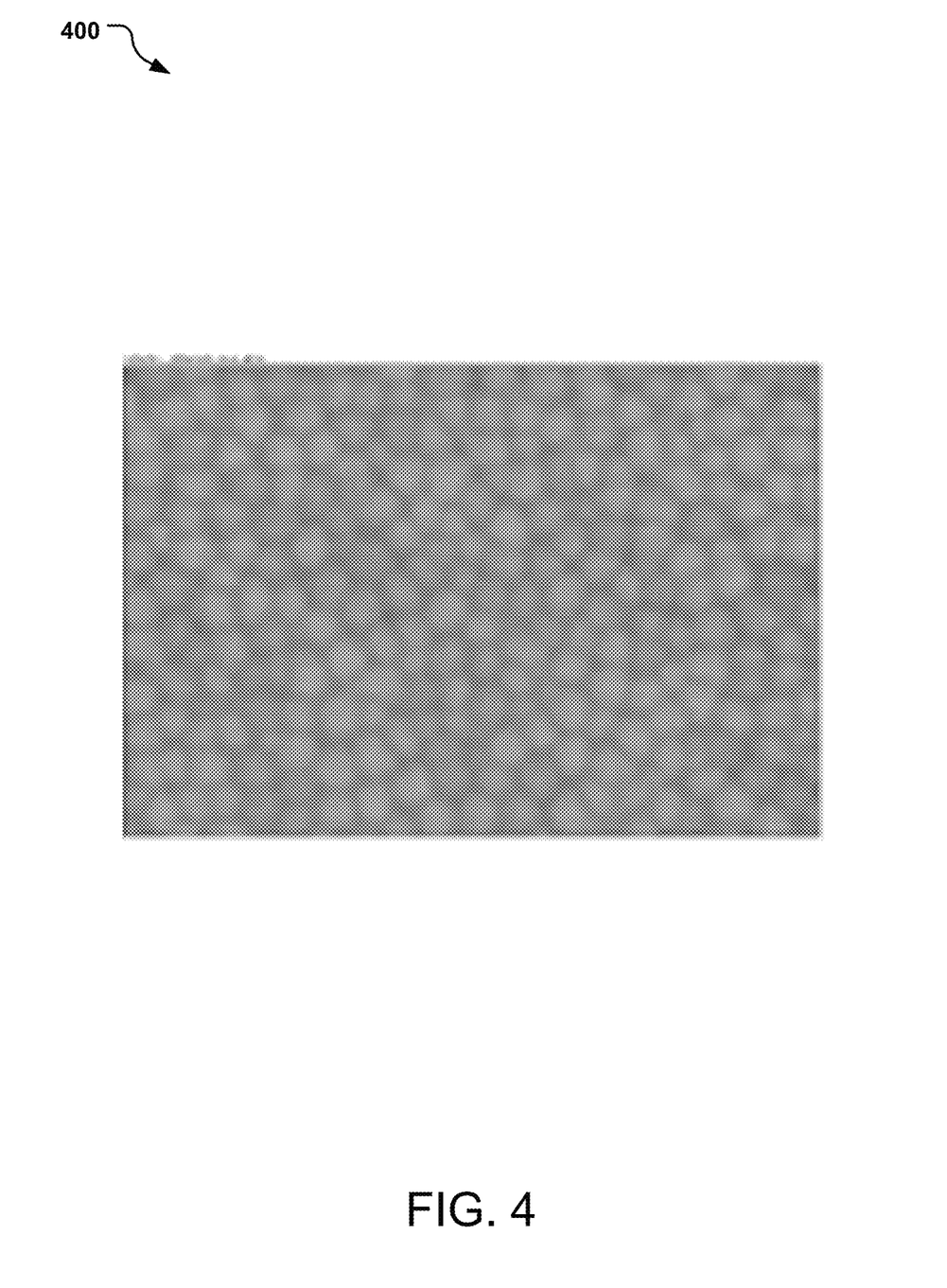
FIG. 4 is the cropped image of FIG. 3.

In step 104, the SEM image from step 102 is cropped. This may include removing noise, blurring edges areas, and/or removing any text or labels in the image. Removing these features reduces the potential for eventual image analysis error. In some implementations, the image size is cropped to a predetermined, fixed, size that is standard for all images processed. FIG. 3 shows an image 300, which is the image 200 from FIG. 2 with the text label 302 called out as well as a guideline 304 where the image 300 will be cropped. The resulting cropped image is shown in FIG. 4 as image 400, with the label and any other indicia removed from the grain image.

Figure 5:
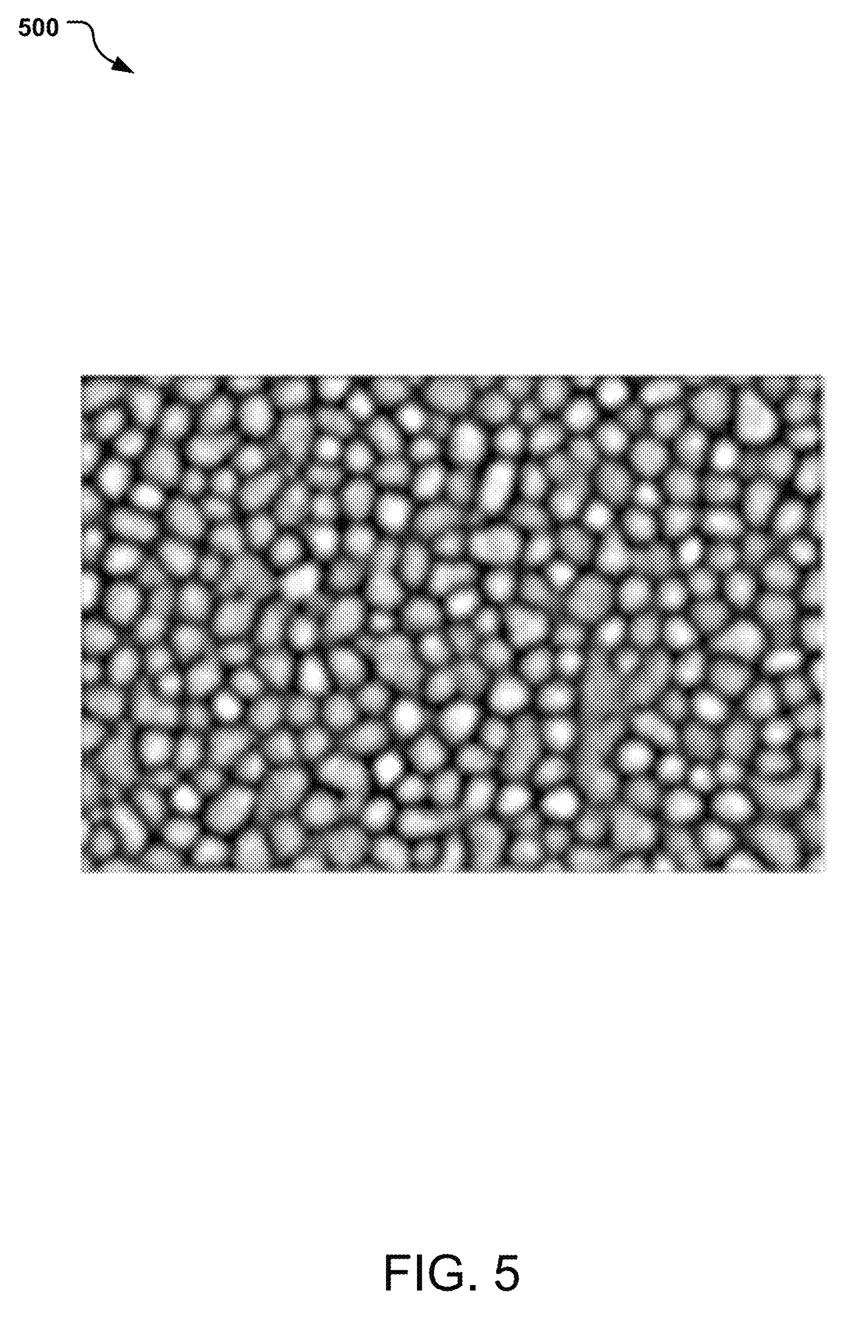
FIG. 5 is the smoothed image of FIG. 4.

In step 106, an image smoothing is applied to the cropped image from step 104. The smoothing step 106 includes blurring the active image or a selected portion thereof, and can decrease the noise points in the image. FIG. 5 shows the smoothed image 500. It is seen in FIG. 5 that the image 500 already has a greater contrast between the grains than in the image 400.

Figure 6:
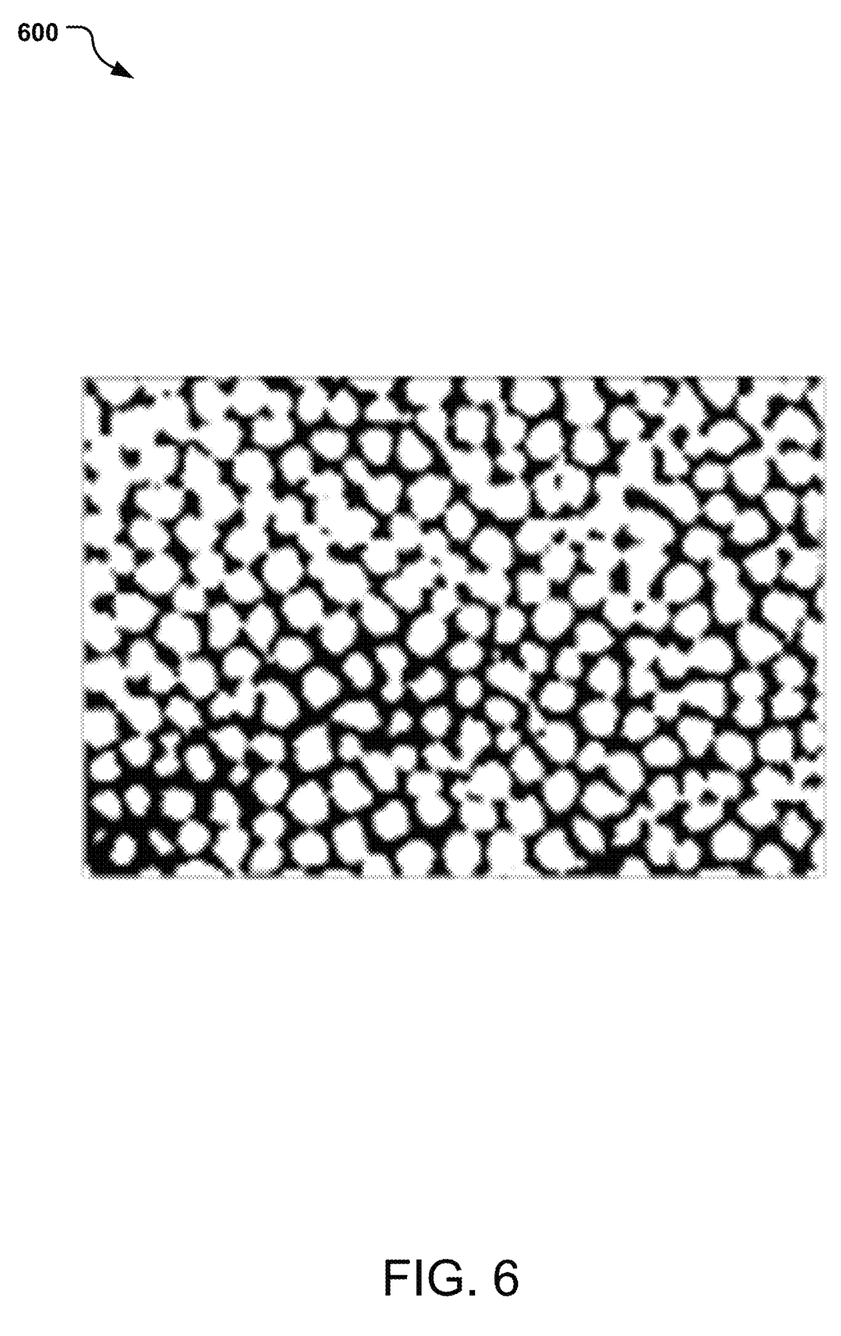
FIG. 6 is the filtered image of FIG. 5.

In step 108, a bandpass filter is applied to the image from the smoothing step 106. Bandpass filtering removes high spatial frequency and low spatial frequencies, and suppresses horizontal and/or vertical stripes that may have been created by scanning of the original image (e.g., line-by-line scanning with a scanner). The parameters for the bandpass filter can be tailored for the specific image (e.g., SEM image) to improve the contrast of the grain boundaries versus the grain so that the grain boundaries are more evident. FIG. 6 shows the filtered image 600.

Figure 7:
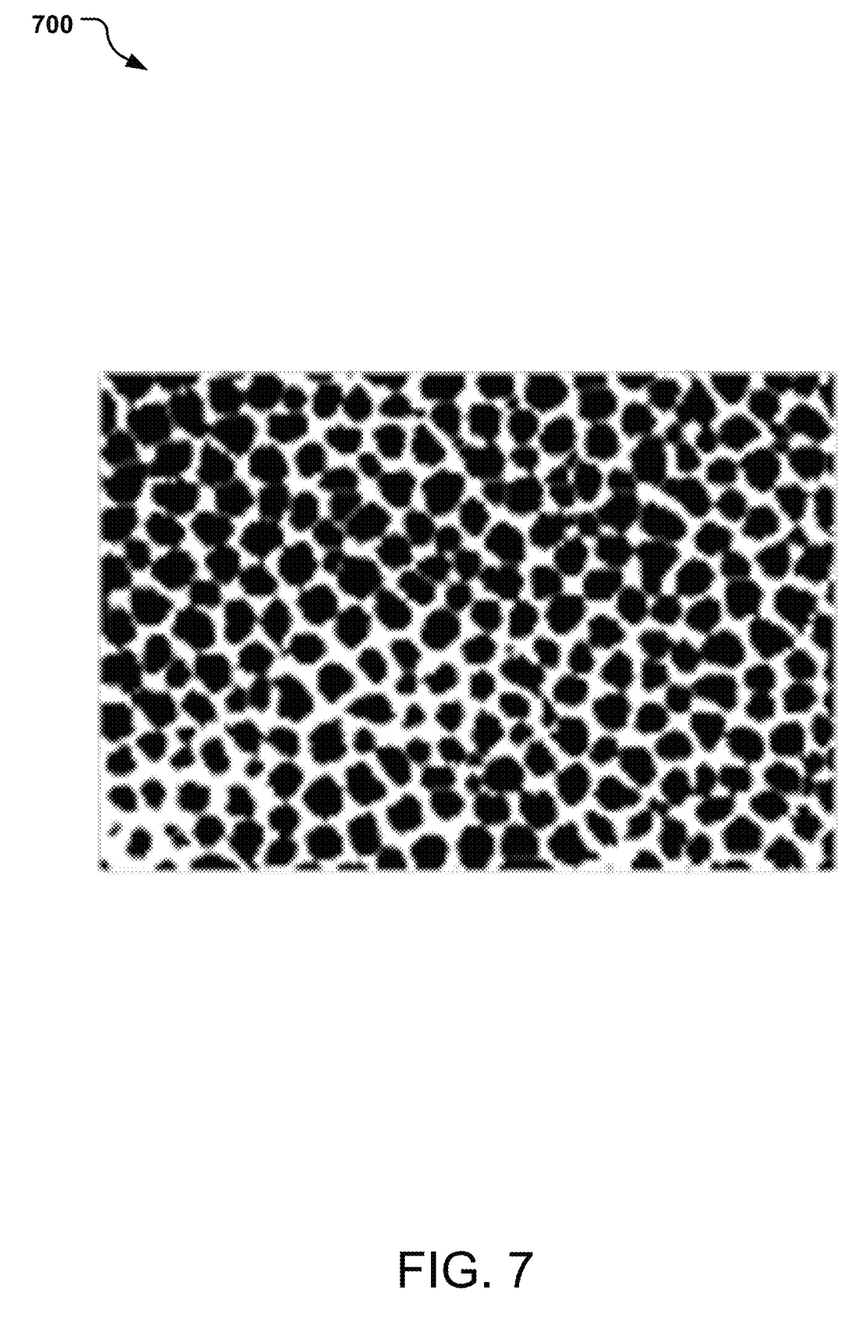
FIG. 7 is the thresholded image of FIG. 6.

In step 110, a robust (automatic) threshold selection is applied. This threshold is applied across regions of the image, emphasizing robust features in the image 600, making it suitable for thresholding noisy images with variable background. The parameters for the threshold can be tailored for the specific image, to create output images having improved contrast. FIG. 7 shows an image 700 with a threshold applied to the image 600 of FIG. 6.

Figure 8:
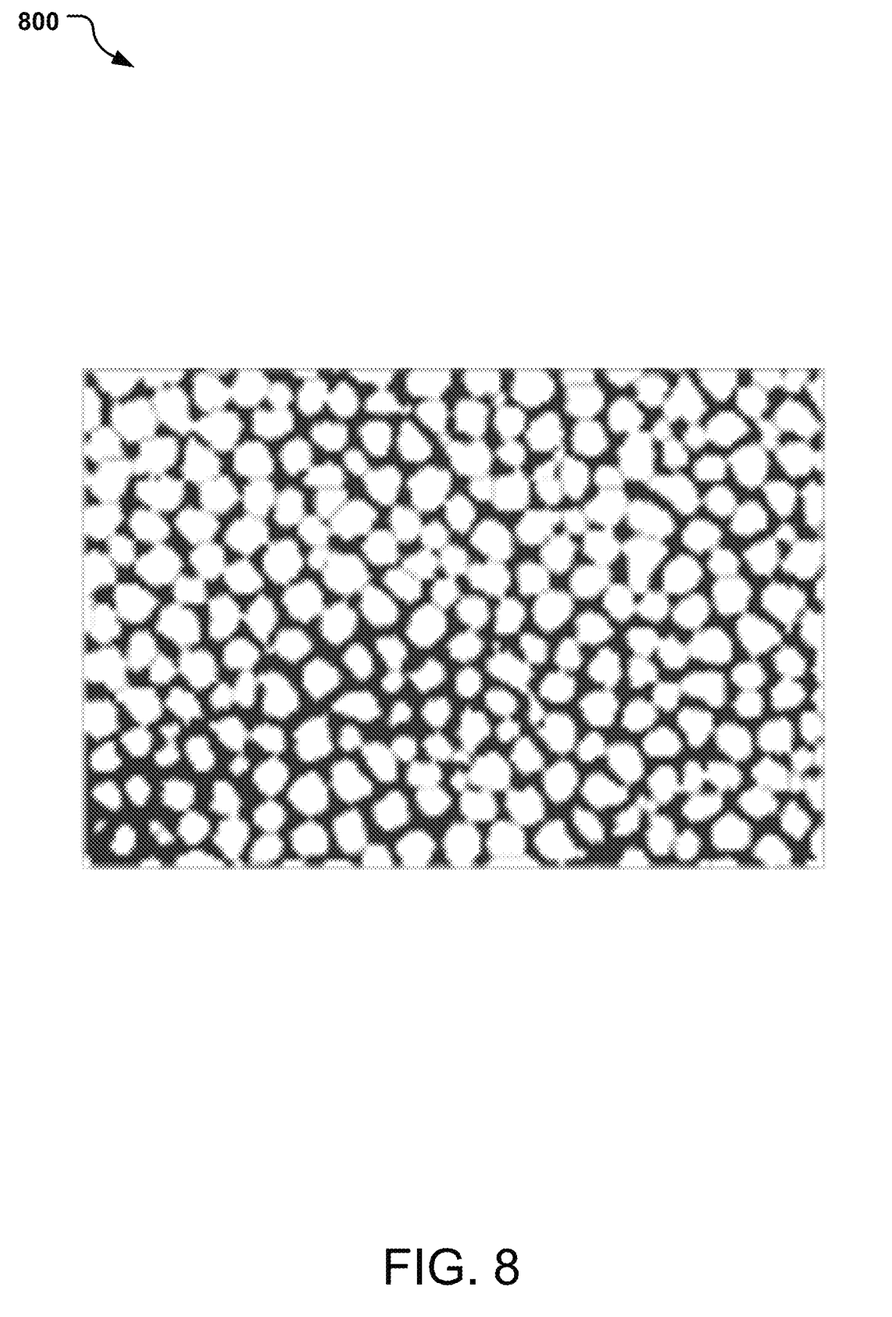
FIG. 8 is the image of FIG. 7 having watershed applied.

In step 112, a watershed segmentation algorithm is applied to the image from step 110, to separate the grain images. The watershed segmentation transforms the image 700 from FIG. 7 to a greyscale image using flooding simulations; FIG. 8 shows a segmented image 800.

Figure 9:
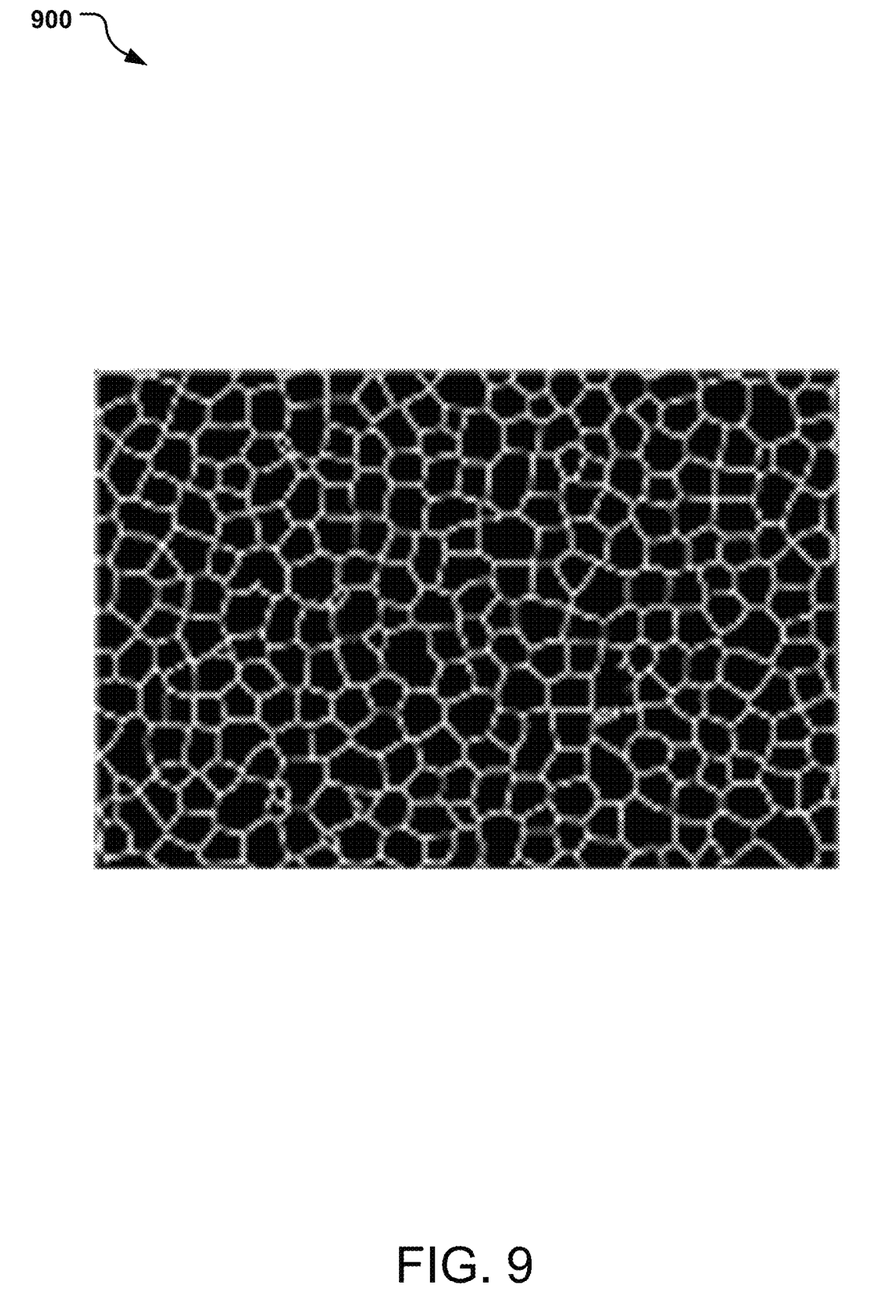
FIG. 9 is the thresholded image of FIG. 8.

In step 114, another image threshold is applied, dividing the image into multiple (e.g., two or more) classes of pixels using a suitable threshold setting. An example of two classes of pixels is foreground and background. FIG. 9 shows the pixelated image 900 having two classes of pixels, which as black and white.

Figure 10:
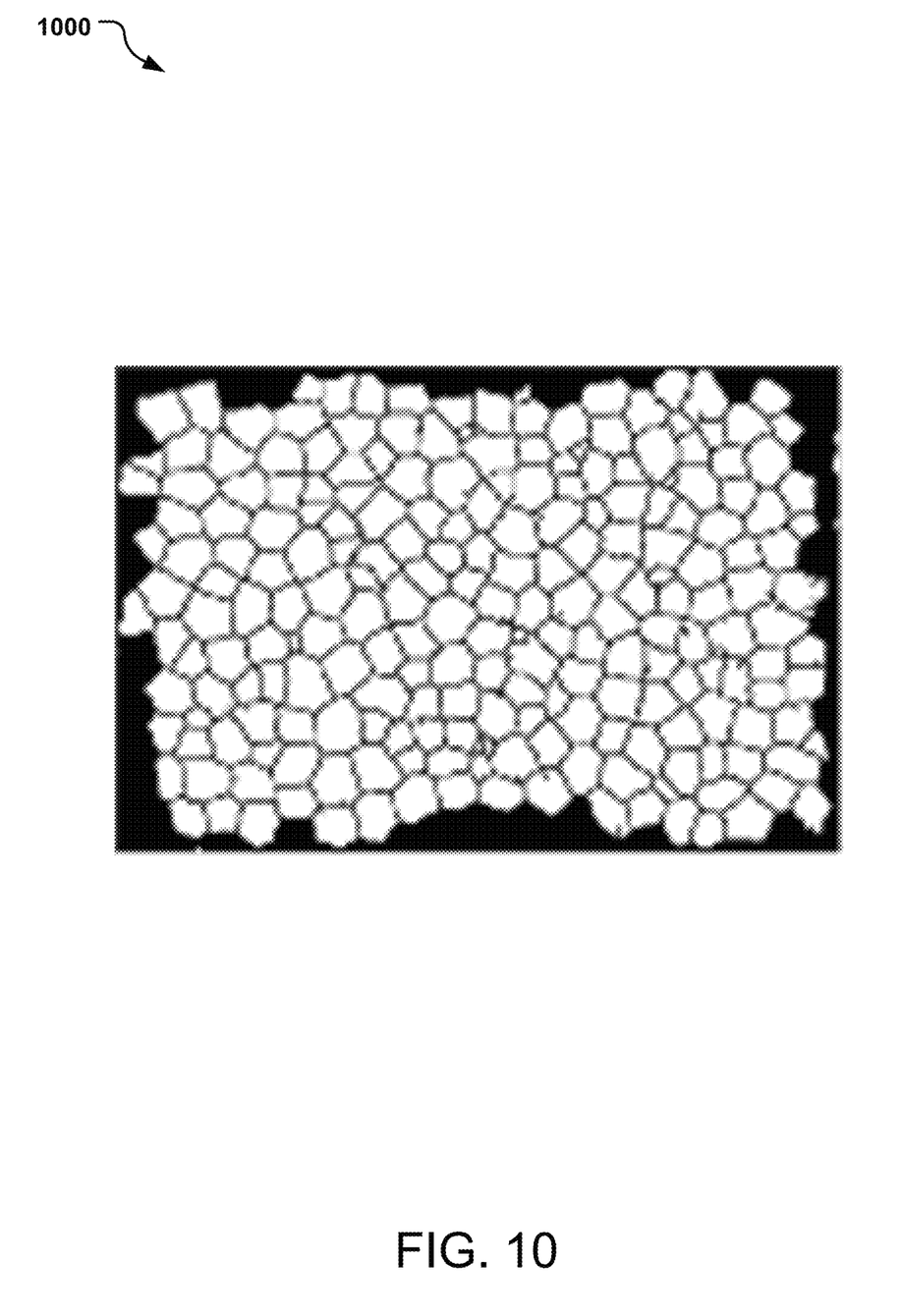
FIG. 10 is a binary image of FIG. 9 showing the incomplete edge grains to be removed.

In step 116, a binary image is created from the thresholded/pixelated image of step 114. Creating the binary image may include one or more step, including dilating, skeletonizing, inverting and/or contrasting, to create a binary image. Creating a binary image removes the boundary width thickness to facilitate a "center-to-center" grain size calculation. FIG. 10 shows a binary image 1000.

Figure 11:
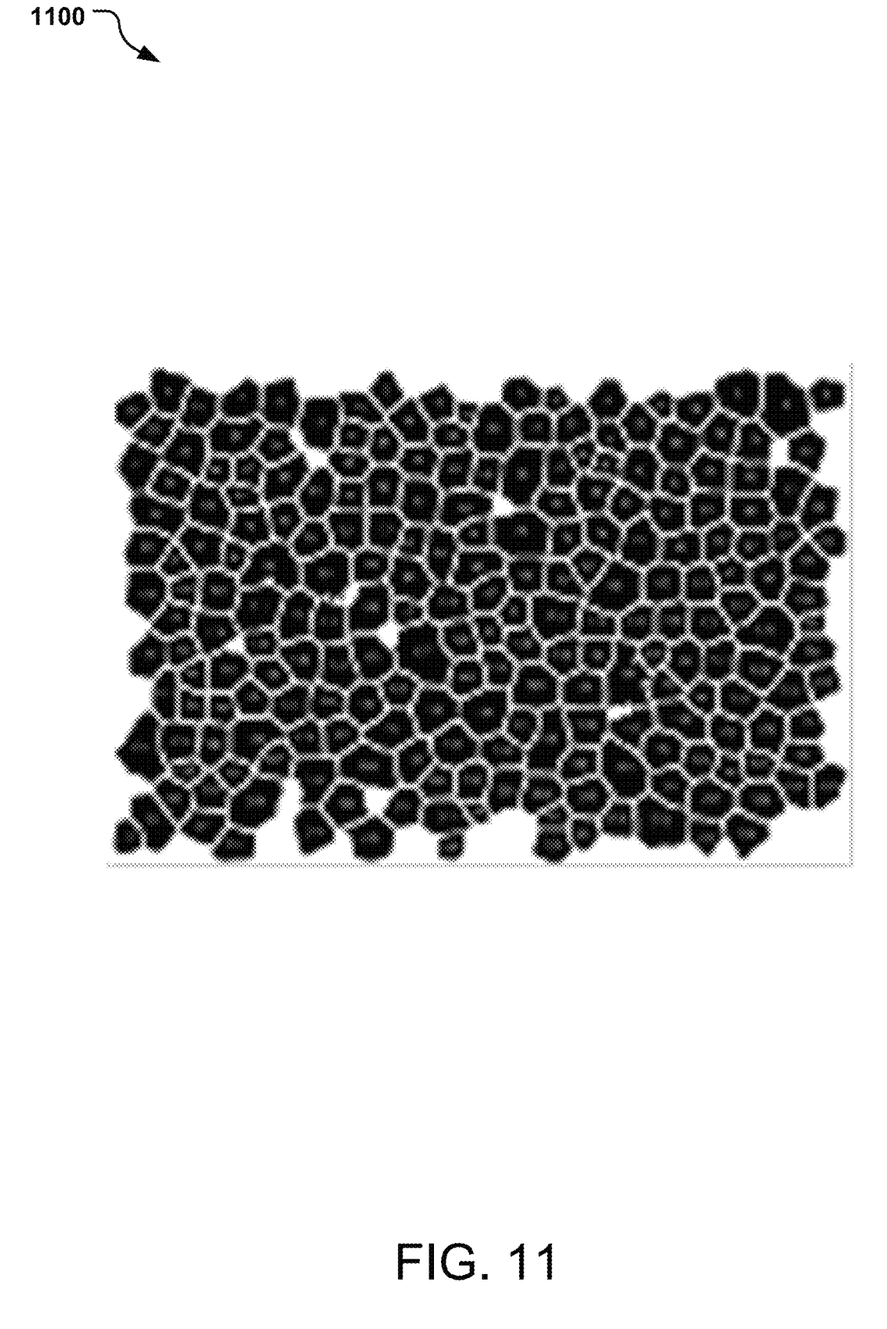
FIG. 11 is the image of FIG. 10 having the incomplete edge grains removed, on which the grain analysis is done.

In step 118, the outside of the image is cleared, e.g., to remove edge grains and/or incomplete grains in the image. In some implementations, overly large particles and overly small particles are removed; this may be done by applying a different contrast to those grains. Removing the edge and any incomplete or distorted grains reduces eventual measurement errors. FIG. 11 shows an image 1100 with the edge grains and any incomplete grains removed.

In step 120, the image 1100 from step 118 is analyzed via an image processing software, such as Fiji. The analysis can use a particle analysis function set-up with a suitable grain size threshold to minimize errors.

From the grain size analysis, the data is saved, such as into a folder together with the image from step 118 (the image 1100 from FIG. 11) and optionally the first image from step 102 (the image 200 from FIG. 2). The user can inspect the processed images to verify the results in some cases. Depending on the image processing software used, the data may be presented as a table and/or a graph. For image processing software that does not provide the data in a readily useable format, a subsequent process may be included.

Figure 12A:
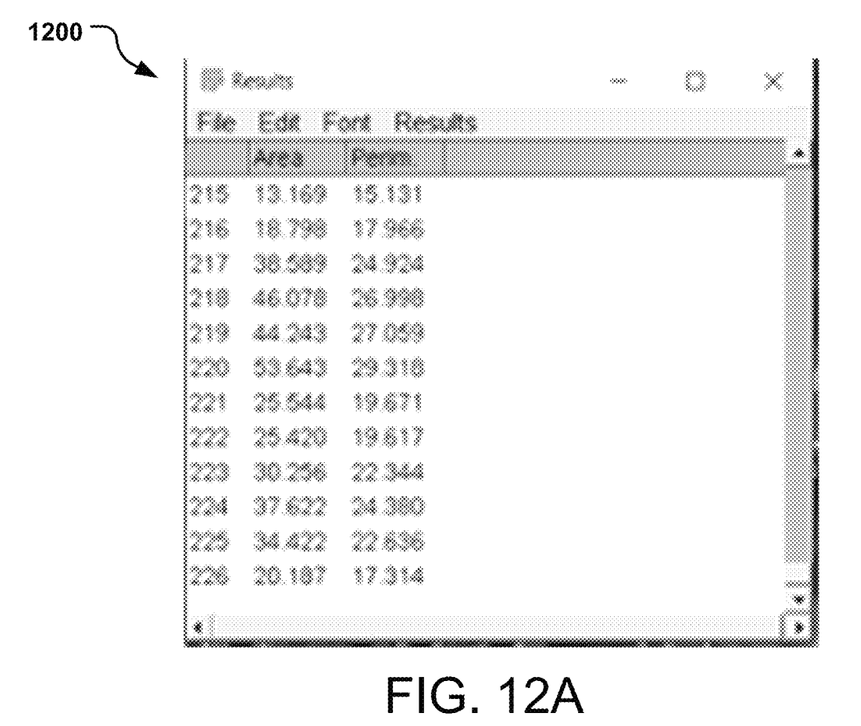
FIG. 12A is table of output data and FIG. 12B is a graph of output data.
Figure 12B:
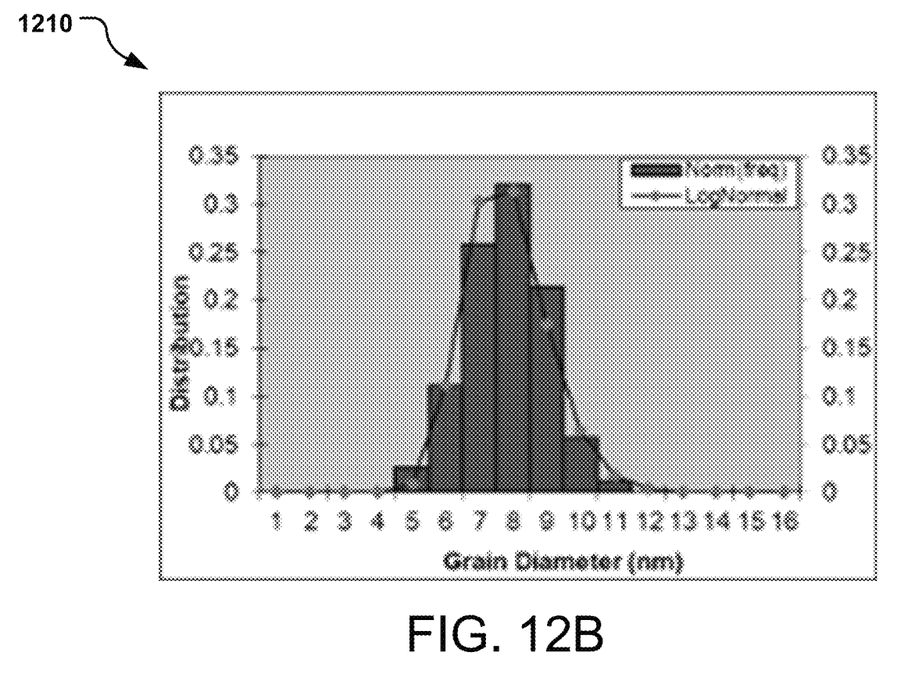

In step 122, the data from the image processing software in step 120 is provided or presented, e.g., as a table and/or a graph. FIG. 12A is an example table 1200 of output data and FIG. 12B is an example output graph 1210.

In some implementations, one or more of the steps may be skipped, done in a different order, or replaced with an alternate step, e.g., a different filtering method.

The individual steps of the pre-analysis image processing method 100, any combination of any of the steps of the method 100, or the full method 100 itself can be implemented as a computer module, algorithm, or as software. Any or all of the steps from the method 100 can be implemented by a computer, e.g., the steps are implemented by instructions stored in a computer memory and/or executed by a processor.

Figure 13:
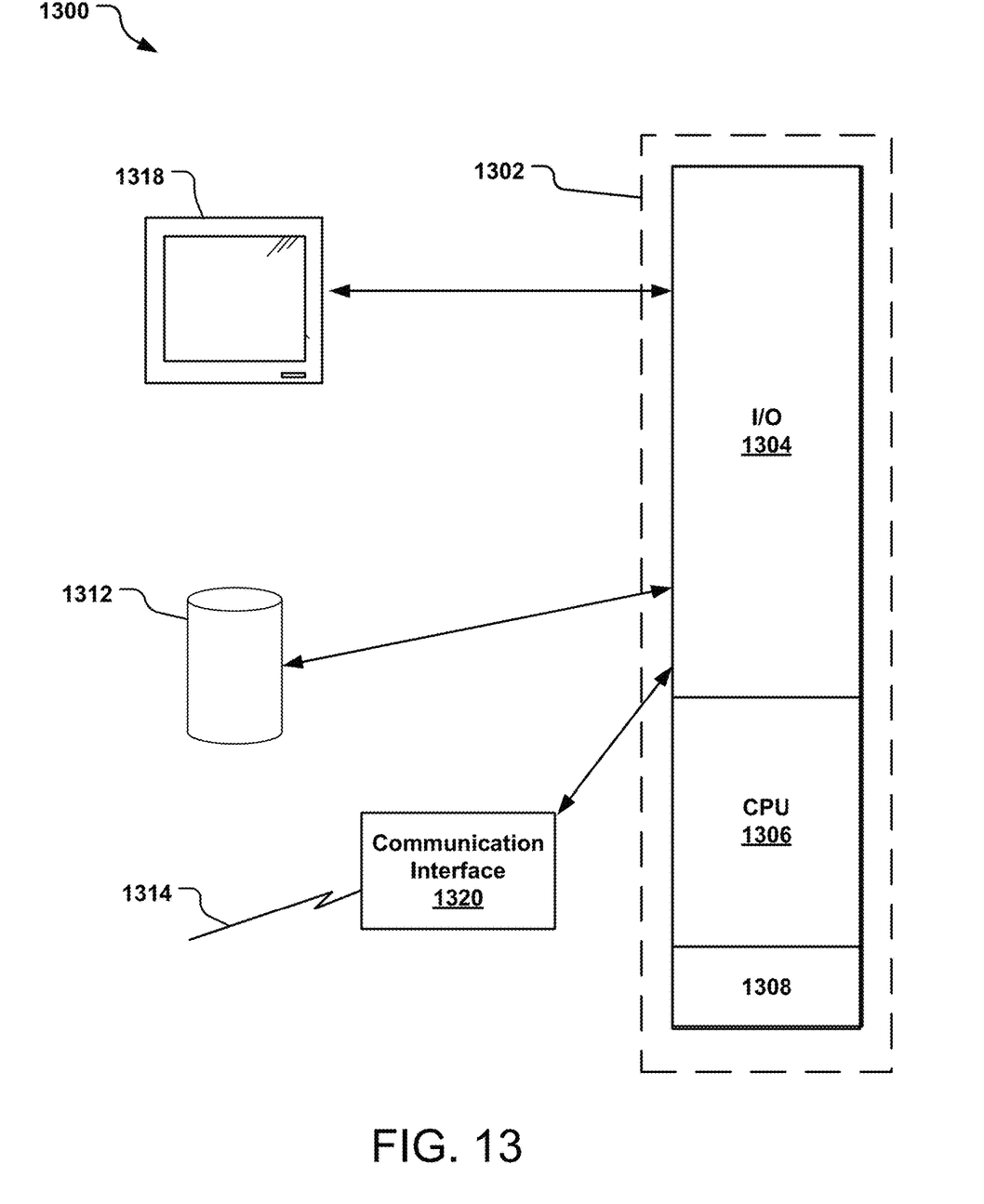
FIG. 13 is a schematic diagram of a general purpose computer system.

FIG. 13 shows a computer system 1300 suitable for implementing one or more steps of a pre-analysis image processing method, such as the pre-analysis image processing method 100 of FIG. 1. The computer system 1300 is capable of executing a computer program product embodied in a tangible computer-readable storage medium to execute a computer process. As used herein, "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium that can be used to store the desired information and that can be accessed by a computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

Data and program files may be input to the computer system 1300, which reads the files and executes the programs using one or more processors. Some of the elements of the computer system 1300 are shown in FIG. 13; the system 1300 has a processor 1302 having an input/output (I/O) section 1304, a Central Processing Unit (CPU) 1306, and a memory section 1308. There may be one or more processors 1302 in the system 1300, such that the processor 1302 of the computing system 1300 comprises a single CPU 1306, or a plurality of CPUs 1306. The processors 1302, 1306 may be single core or multi-core processors.

The computing system 1300 may be a conventional computer, a distributed computer, or any other type of computer. The described technology is optionally implemented in software (modules) loaded in memory 1308, in a storage unit 1312, and/or communicated via a wired or wireless network link 1314 on a carrier signal (e.g., Ethernet, 3G wireless, 6G wireless, LTE (Long Term Evolution)) thereby transforming the computing system 1300 in FIG. 13 to a special purpose machine for implementing the described operations.

The I/O section 1304 may be connected to one or more user-interface devices (e.g., a keyboard, a touch-screen display unit 1318, etc.) or a storage unit 1312. Computer program products containing mechanisms to effectuate the systems and methods in accordance with the described technology may reside in the memory section 1308 or on the storage unit 1312 (e.g., a disc storage unit) of such a computer system 1300.

A communication interface 1320 is capable of connecting the computer system 1300 to a network via the network link 1314, through which the computer system can receive instructions and data embodied in a carrier wave. When used in a local area networking (LAN) environment, the computing system 1300 is connected (by wired connection or wirelessly) to a local network through the communication interface 1320, which is one type of communications device. When used in a wide-area-networking (WAN) environment, the computing system 1300 typically includes a modem, a network adapter, or any other type of communications device for establishing communications over the wide area network. In a networked environment, program modules depicted relative to the computing system 1300 or portions thereof, may be stored in a remote memory storage device. It is appreciated that the network connections shown are examples of communications devices for and other means of establishing a communications link between the computers may be used.

In an example implementation, any or all of the steps from the automated grain size analysis method 100 (from FIG. 1) are embodied by instructions stored in the memory 1308 and/or the storage unit 1312 and executed by the processor 1302.

One or more relational databases storing data used in comparing different measurements may be stored in the storage unit 1312 or other storage locations accessible by the computer system 1300. In addition, the computer system 1300 may utilize a variety of online analytical processing tools to mine and process data from the databases. Further, local computing systems, remote data sources and/or services, and other associated logic represent firmware, hardware, and/or software, which may be configured to characterize and compare different locales. A pre-analysis image processing method of this disclosure can be implemented using a general purpose computer and specialized software (such as a server executing service software), a special purpose computing system and specialized software (such as a mobile device or network appliance executing service software), or other computing configurations. In addition, any or all of the module(s) may be stored in the memory 1308 and/or the storage unit 1312 and executed by the processor 1302.

The implementations described herein are implemented as logical steps in one or more computer systems. The logical operations of the present invention are implemented (1) as a sequence of processor-implemented steps executing in one or more computer systems and (2) as interconnected machines or circuit modules within one or more computer systems. The implementation is a matter of choice, dependent on the performance requirements of the computer system implementing the invention. Accordingly, the logical operations making up the implementations described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

Thus, described herein is an automated, pre-analysis image processing method suitable for use with image processing software (e.g., Fiji image processing software) to analyze grain size in magnetic media (e.g., for disc drives). Although the pre-analysis image processing method has been described and shown for magnetic media, generally composed of, e.g., nickel (Ni), iron (Fe), cobalt (Co), boron (B), or tantalum (Ta), and various alloys thereof, the method can be applied to any granular or crystal material.

Various features and details have been provided in the multiple designs described above. It is to be understood that any features or details of one design may be utilized for any other design, unless contrary to the construction or configuration. Any variations may be made. For example, one or more steps of the pre-analysis image processing method 100 may be eliminated, or some steps may be done in a different order. Some steps may be replaced with a different function.

The above specification and examples provide a complete description of the method and use of exemplary implementations. The above description provides specific implementations. It is to be understood that other implementations are contemplated and may be made without departing from the scope or spirit of the present disclosure. The above detailed description, therefore, is not to be taken in a limiting sense. For example, elements or features of one example, embodiment or implementation may be applied to any other example, embodiment or implementation described herein to the extent such contents do not conflict. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "bottom," "lower", "top", "upper", "beneath", "below", "above", "on top", "on," etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

What is claimed is:

1. A computer-implemented method for automated grain size analysis, comprising:
obtaining a scanning electron microscope (SEM) electronic image of a magnetic material composed of a plurality of grains; and
modifying the image to generate grain size data from the image by:
smoothing the image to provide a smoothed image;
removing high spatial and low spatial frequencies from the smoothed image to provide a filtered image;
improving contrast of the filtered image to provide an improved contrast image;
pixelating the improved contrast image to provide a pixelated image;
processing the pixelated image to a binary image; and
clearing outer edges of the binary image to remove incomplete grains.

2. The method of claim 1 further comprising modifying the smoothed image by suppressing horizontal and vertical stripes in the smoothed image.

3. The method of claim 1 further comprising modifying the image by cropping the image to reduce size of the image and remove any indicia.

4. The method of claim 1 wherein pixelating the improved contrast image comprises dividing the improved contrast image into multiple classes of pixels to obtain the pixelated image.

5. The method of claim 1 wherein processing the pixelated image to the binary image comprises at least one of dilating, skeletonizing, inverting and contrasting to create the binary image.

6. The method of claim 1 further comprising generating grain size data from the image having cleared outer edges and presenting the grain size data in table form.

7. The method of claim 1 further comprising generating grain size data from the image having cleared outer edges and presenting the grain size data in graphical form.

8. A computer-implemented method for automated grain size analysis, comprising:
obtaining a scanning electron microscope (SEM) electronic image of a magnetic material composed of a plurality of grains;
applying a smoothing to the SEM electronic image to obtain a smoothed image;
applying an image filter to the smoothed image to remove high spatial and low spatial frequencies to obtain a filtered image;
applying a robust threshold selection to the filtered image to obtain an improved contrast image;
applying a watershed algorithm to the improved contrast image to obtain a segmented image;
applying a second threshold to the segmented image to obtain a pixelated image;
processing the pixelated image to a binary image;
clearing outer edges of the binary image to remove at least incomplete grains; and
generating grain size data from the binary image.

9. The method of claim 8, wherein obtaining a scanning electron microscope (SEM) electronic image comprises obtaining the SEM electronic image from a memory.

10. The method of claim 9, comprising obtaining multiple SEM electronic images from the memory.

11. The method of claim 8 further comprising cropping the obtained SEM electronic image.

12. The method of claim 11, wherein cropping includes reducing the image size and removing any indicia.

13. The method of claim 8, wherein applying an image filter to the smoothed image further suppresses horizontal and vertical stripes to obtain the filtered image.

14. The method of claim 8, wherein the image filter is a bandpass filter.

15. The method of claim 8, wherein applying a second threshold to the segmented image comprises dividing the segmented image into multiple classes of pixels to obtain a pixelated image.

16. The method of claim 8, wherein processing the pixelated image to a binary image comprises at least one of dilating, skeletonizing, inverting and contrasting to create the binary image.

17. The method of claim 8 further comprising presenting the grain size data in table form.

18. The method of claim 8 further comprising presenting the grain size data in graphical form.

19. A computing device, comprising:
a processor; and
a memory having computer-executable instructions stored thereupon, which, when executed by the processor, causes the computing device to:
obtain a scanning electron microscope (SEM) electronic image of a magnetic material composed of a plurality of grains from the memory;
apply a smoothing to the SEM electronic image to obtain a smoothed image;
apply an image filter to the smoothed image to remove high spatial and low spatial frequencies to obtain a filtered image;
apply a robust threshold selection to the filtered image to obtain an improved contrast image;
apply a watershed algorithm to the improved contrast image to obtain a segmented image;
apply a second threshold to the segmented image to obtain a pixelated image;
process the pixelated image to a binary image;
clear outer edges of the binary image to remove at least incomplete grains; and
generate grain size data from the binary image.

20. The computing device of claim 19 wherein the computing device obtains multiple SEM electronic images from the memory.

* * * * *